(12) United States Patent
Edwards et al.

(10) Patent No.: US 10,348,911 B2
(45) Date of Patent: Jul. 9, 2019

(54) ONLINE DATA VALIDATOR OF THE PRINTING UNIT

(71) Applicant: TSC Auto ID Technology Co., Ltd., New Taipei (TW)

(72) Inventors: Andrew W. Edwards, New Taipei (TW); William J. Brown, New Taipei (TW); Ming-Te Chen, New Taipei (TW); Kevin P. Moore, New Taipei (TW); Mark A. Young, New Taipei (TW); Greg J. Anderson, New Taipei (TW); Kenneth R. Kuhn, New Taipei (TW); Raul Velasquez, New Taipei (TW); Freek Kempe, New Taipei (TW)

(73) Assignee: TSC AUTO ID TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/000,897

(22) Filed: Jun. 6, 2018

(65) Prior Publication Data

US 2019/0116275 A1    Apr. 18, 2019

Related U.S. Application Data

(60) Provisional application No. 62/574,183, filed on Oct. 18, 2017.

(51) Int. Cl.
| | |
|---|---|
| *H04N 1/00* | (2006.01) |
| *G06K 5/02* | (2006.01) |
| *G06K 7/14* | (2006.01) |
| *G02B 3/08* | (2006.01) |
| *G06K 7/10* | (2006.01) |
| *B65C 9/46* | (2006.01) |
| *B65C 9/40* | (2006.01) |

(52) U.S. Cl.
CPC .......... *H04N 1/00246* (2013.01); *B65C 9/46* (2013.01); *G02B 3/08* (2013.01); *G06K 5/02* (2013.01); *G06K 7/10722* (2013.01); *G06K 7/1408* (2013.01); *G06K 7/1443* (2013.01); *B65C 2009/404* (2013.01)

(58) Field of Classification Search
CPC .................. H04N 1/00246; B65C 9/46; B65C 2009/404; G02B 3/08; G06K 5/02; G06K 7/10722; G06K 7/1408; G06K 7/1443
See application file for complete search history.

(56) References Cited

U.S. PATENT DOCUMENTS

| | | | |
|---|---|---|---|
| 6,535,299 B1 * | 3/2003 | Scherz ..................... | G06K 5/02 358/1.12 |
| 7,995,196 B1 * | 8/2011 | Fraser ................ | G06K 9/00577 356/71 |

* cited by examiner

*Primary Examiner* — Quang N Vo
(74) *Attorney, Agent, or Firm* — Chun-Ming Shih

(57) ABSTRACT

An online data validator is a digital imaging system integrated onto the front side of a printing unit wherein an exit of the printing unit is set on the same side close to the online data validator for a media exiting therefrom. The online data validator comprises a controller facilitating communication with a printing unit controller and controlling overall operation of the online data validator functions; a camera module including a sensor PCB and an optical lens, wherein the sensor PCB contains a camera sensor for capturing 2D digital images of moving labels; and a light source module including a lightbar, a lightbar PCB, a Fresnel lens and a window for providing uniform and flattened illumination on the media.

20 Claims, 2 Drawing Sheets

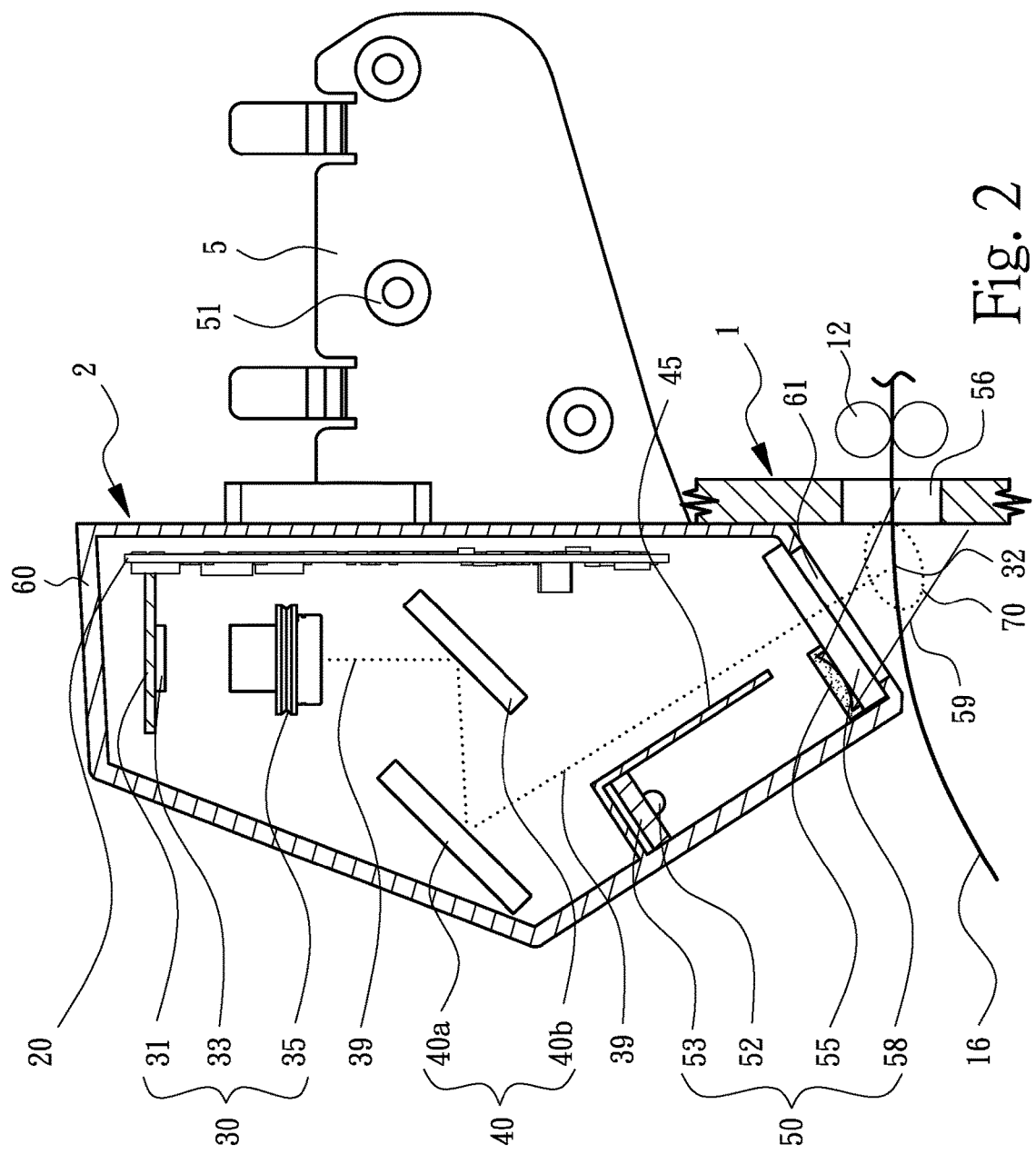

ONLINE DATA VALIDATOR OF THE PRINTING UNIT

FIELD OF THE INVENTION

The invention relates to a data validator of the printing unit, and more particularly to a compact and two-dimensional online data validator covering an integrated printing and verification system to measure and correct for barcode print quality.

BACKGROUND OF THE INVENTION

Products often include coded labels, such as barcodes, which can be used to identify and track products in stores, supermarkets, warehouses and other commercial and industrial products. Currently, the barcodes have become a significant requirement in the commodity supply chain of various industries, and have been received much attention in consumer payments, finances and services. Stationary or mobile barcode scanners can be used to read the barcode's image data and report the barcode's content out via an exit of a printing unit for analyzing and processing as a verifier or validator. Generally, the verifier is used to measure barcodes (bar/space widths, black/white contrast and other parameters) and grade barcodes (quantifiable value based on measurement data); in addition, the validator also has the functions to validate barcodes and compare read data to the intended printed data. The two-dimensional online data validator (ODV2D) of the present invention measures and grades barcodes like the verifier but does not need to be strictly limited by all aspects of the ISO 15426 verifier requirements. The existing online barcode technology that is integrated into printing units and that is available on the market today encounters following problems.

First, existing technology may use third party barcode scanners (or readers) mounted to the front of the printing unit. Some standalone scanner technologies do not measure or grade barcodes, they can only read the barcode values. Further, the add-on approach often leads to performance limitations such as printing the whole label before scanning, restricting the location of where the barcode must be printed on the label in order for it to be scanned, lengthy setup procedures to identify barcode locations for each new label, and there may be limitations in terms of being able to backup and overstrike a label when an unreadable barcode is detected.

Second, existing technology may use CCD (charge-coupled device) single dot-row contact scanners that are mounted to the front of the printing unit. This technology requires contact with the label which can result in accumulated dirt and debris from the printing unit supplies, and thus impacting barcode measurement and grading. The ability to integrate with the target printing unit will depend on the printing unit performance capabilities and necessary interfaces which could impact the ability to perform certain functions such as overstriking of labels. Further, this technology may require an external laptop or desktop computer to process the data which not only adds cost but also increases system footprint.

In order to solve the above problems, the new technologies related to the invention offers the capabilities that are otherwise not available in the market today.

SUMMARY OF THE INVENTION

The online data validator of the invention is a digital imaging system integrated onto the front side of a printing unit wherein an exit of the printing unit is set on the same side close to the online data validator for a media exiting therefrom, the online data validator comprises a controller facilitating communication with a printing unit controller and controlling overall operation of the online data validator functions; a camera module capturing digital 2D (two-dimensional) images of moving labels; a mirror module reflecting the images to the optical lens and allowing a reduced footprint enclosure; a light source module providing uniform and flattened illumination on the media; and a sealed enclosure that accommodates the above components therein and prevents dust contamination.

The following new technologies related to this invention offer capabilities that are otherwise not available in the market today.

The present online data validator is fully integrated within the target printing unit system for reducing footprint and allowing for features such as backup and overstrike of labels with bad barcodes.

The present target printing unit system is able to extract the location of the barcodes as the host data stream is processed and provide those locations and symbols to the online data validator in advance to relieve the need for time-consuming static identification and setup procedures.

The present online data validator can scan, measure and grade 1D (one-dimensional) barcodes in both picket fence and ladder orientation, as well as 2D barcodes.

The present online data validator is mounted away from the printed label and so does not pick up dirt and debris from the labels, and facilitates easy loading of media and ribbon, and different print technologies (such as thermal, inkjet, or laser).

The present online data validator scans the label as it is printed to create swathes of data representing the printed format, and so is not constrained by having to 'see' the whole label before measurement and grading.

Based on the above new technologies, the present online data validator of the invention can notably provide many advantages, such as:

The present online data validator provides a new technology for online barcode verification when used with thermal, or other print technologies. The purpose of the system is to measure, report, and serve to enable printing units to self-correct for barcode print quality issues. The benefits to an online barcode verification system on a printing unit are documented in the original U.S. Pat. No. 6,535,299.

The present online data validator provides a folded mirrors concept causing the mirrors to form a folded optical path which allows the validator to be mounted closer to the printed label and produced economically in a very small volume.

The present online data validator provides a low cost means to generate high intensity illumination sources from an array of low cost light sources, such as LEDs (light-emitting diodes), to control the drive to the light sources so as to compensate for illumination variance in the imaging system, to control the light sources spatial distribution so as to produce a uniform illumination field due to their position in the array, and to utilize low cost optical elements to further flatten the illumination across the field of view, to overcome typical illumination sources which do not inherently produce uniform illumination without additional and often complex (costly) optics and not stable over time.

The present online data validator provides its own integrated controller that is dedicated to processing the scanned data and sending the results to the printing unit, to overcome the existing technology that may require an external laptop or desktop computer to process the data.

The present online data validator attached to the front of the printing unit not only provides the ability to read barcode data but also to eliminate the accumulation of dust or dirt and so will not impact barcode measurement and grading, this overcomes the existing technology whereby the scan head makes direct contact with the printed label, and then, any excess paper dust or adhesive can be deposited onto the scan head. This in turn blocks the sensor elements from reading data from the label and presents barcode validation.

The present online data validator provides an extension of an existing capability to 1D ladder barcodes and 2D barcodes, to overcome the existing technology of barcode-printing and verification that is based on a verification instrument and can only verify 1D picket-fence barcodes.

The present online data validator applies a high speed digital image acquisition system by using a camera technology whereby a narrow picture (nominally 10 pixels wide) is taken synchronously with the printing unit motor drive circuit (which moves the labels through the print station). These narrow pictures (or swaths) are placed in a memory buffer and processed real time as the image is captured. This means that the analysis is happening while printing rather than waiting for the whole label to be printed.

The present online data validator provides an online sub-frame images reconstruction function from moving target by synchronously taking narrow (nominally 5-pixel or 10-pixel wide) pictures with paper movement and sending to a buffer where the whole printed image is reconstructed into the bit image of a label. As the image is constructed, the software scans the image for barcodes, regardless of their type or orientation, to overcome the existing technology that requests to print out the whole label before scanning and limits the location of printing and scanning.

The present online data validator provides a coordinate tracking command system with the printing unit controller which examines the incoming data for every barcode print commands including information such as the barcode type, barcode data and point coordinates. In addition to print commands, incoming graphic images are analyzed to determine what barcodes are present and where they are located. Once collected, the information is sent to the online data validator controller to look for a barcode and what barcode data should be there, to solve the problem that takes a long time to process with traditional identification and setting programs where barcode type, data, and coordinates are unknown.

Further, by applying the present invention, barcodes can be printed in any orthogonal orientation (relative to the print direction), and still can be detected, measured, and print quality compensated for based on a verifier instrument.

BRIEF DESCRIPTION OF THE DRAWINGS

FIG. 2 is a schematic diagram of a sectional view of the online data validator in FIG. 1 according to the present invention.

DETAILED DESCRIPTION OF THE PREFERRED EMBODIMENT

Figure 1:
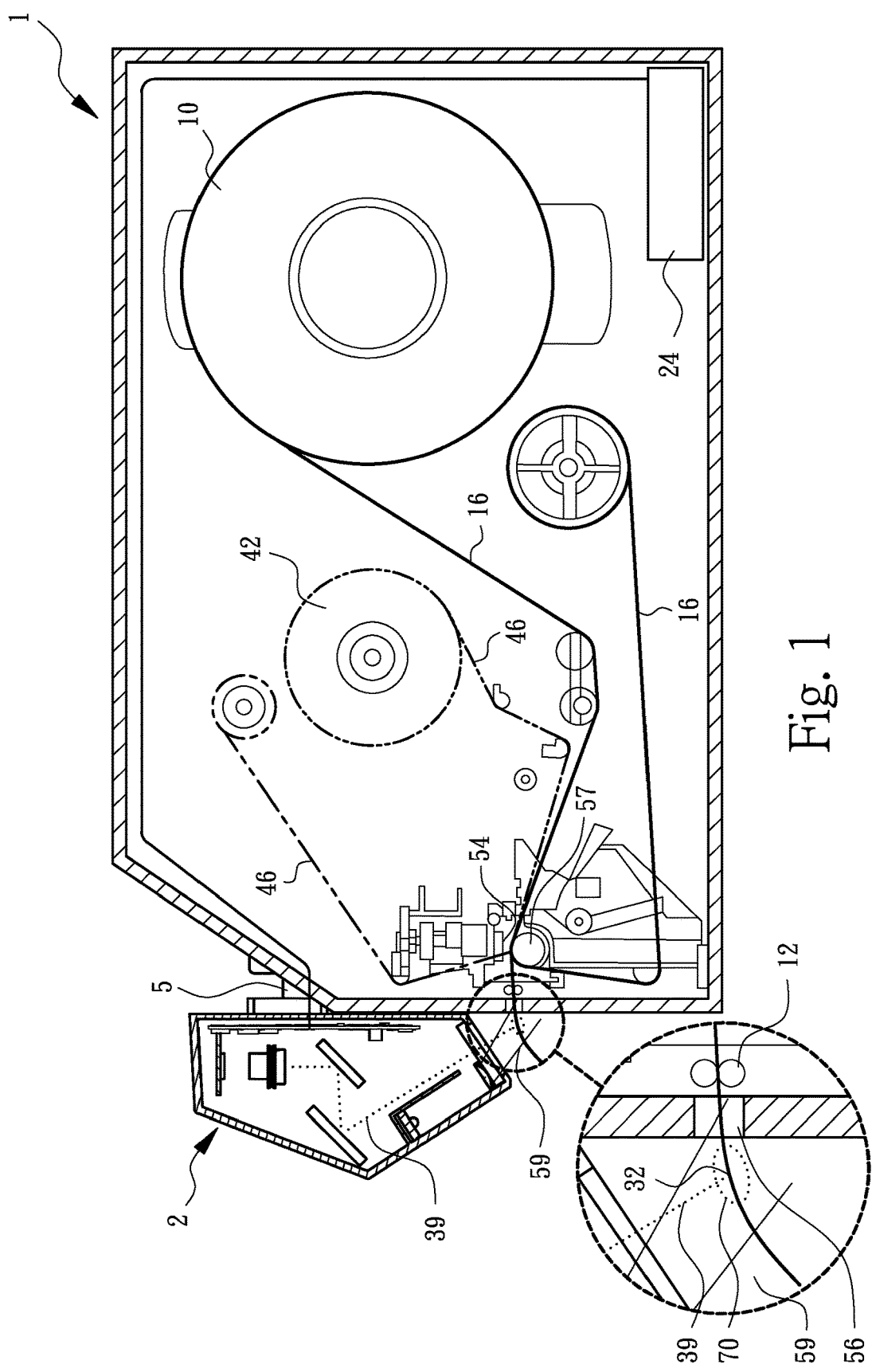
FIG. 1 is a schematic diagram of a sectional view of a printing unit with an online data validator according to a preferred embodiment of the present invention.

The present invention provides an online data validator 2 to fully integrate within a printing unit 1 which can be a thermal printer used in the U.S. Pat. No. 6,535,299 or other commercially-available printers, such as an inkjet printer or a laser printer, for printing barcodes.

Refer to FIG. 1 for a schematic diagram of a sectional view of a printing unit 1 with the online data validator 2 according to the preferred embodiment of the present invention. The online data validator 2 through a bracket 5 is mounted on the printing unit 1 using screws (not shown) inserted at mounting holes 51 in the bracket 5 disclosed in the original U.S. Pat. No. 6,535,299 and integrated onto the front side of the printing unit 1. An exit 56 of the printing unit 1 is set on the same side close to the online data validator 2, so that a scan line beam 59 emitted from the online data validator 2 scans the width of a label 32 on a scan target 70 near the exit 56 for barcode verification. The label 32 (such as 1D barcodes in both picket fence and ladder orientation, 2D barcodes, and other targets), for example, can be formed from a media 16 (such as paper, plastic or other materials). When the media 16 that is fed off a spool 10 and a thermal sensitive print ribbon 46 that is fed off a spool 42 pass over a thermal print head 54 from a rotating platen 57, the printed label 32 is formed on the media 16.

The print modes of the thermal printer usually use thermal transfer printing technologies, meaning that a material with specific formulation is used to form the printed image on the label 32 as a result of heat pulses from the print head 54. One of the print modes may be used the ribbon 46 with a thermal sensitive wax/resin, full wax or full resin formulation. An alternative print mode supported by the same system of the printing unit 1 is direct thermal printing which uses the media 16 with dyes impregnated within the media 16 fibers, and which turn black when heated. In this print mode, the printing unit 1 can play the same effect without the use of the ribbon 46.

Refer to FIG. 2 for a schematic diagram of a sectional view of the online data validator 2 in FIG. 1 according to the present invention. The online data validator 2 is a digital imaging system integrated onto the front side of the printing unit 1 wherein the exit 56 of the printing unit 1 is set on the same side close to the online data validator 2 for images of printed labels 32 on a media 16 exiting therefrom. The exit 56 may further include limiters 12 such as rollers or bars to constrain the printed labels 32 near the scan target 70 for improving scanning accuracy.

The online data validator 2 comprises a controller 20, a camera including optical components of a camera module 30 and a mirror module 40, a light source module 50 and an enclosure 60. The camera module 30 includes a sensor PCB (printed circuit board) 31 and an optical lens 35, wherein the sensor PCB 31 contains a camera sensor 33. The optical lens 35 is arranged between the camera sensor 33 and the mirror module 40. The mirror module 40 includes two mirrors arranged between the camera module 30 and the light source module 50. The light source module 50 includes a lightbar 52, a lightbar PCB 53, a Fresnel lens 55 and a transparent element 58. The enclosure 60 has a window 61 at a nearest distance from the exit 56 of the printing unit 1.

The controller 20 facilitates communication with a printing unit controller 24 (refer to FIG. 1) which dominates the overall operation of the printing unit 1 and controls the operation of the online data validator 2 functions. The controller 20 gathers data from the camera sensor 33, controls the strobing of the lightbar 52, finds, decodes, and grades the barcodes embedded in scanned data from the camera sensor 33, and sends results back to the printing unit 1. The camera sensor 33 of the camera module 30 is a high speed 2D digital imager to take pictures of the printed labels 32. The optical lens 35 of the camera module 30 receives the scanned image from the printing unit 1 print line and converts the resolution to be compatible with the camera sensor 33. The mirror module 40 reflects the scanned image from the scan line 39 to the optical lens 35, allowing a reduced footprint enclosure 60.

The light source module 50 provides internal light sources illuminating the scan target 70 on the media 16 exiting from the exit 56. The lightbar 52 electronically connected to the lightbar PCB 53 of the light source module 50 provides necessary lighting to ensure proper scanning of the printed labels 32. The Fresnel lens 55 of the light source module 50 is placed between the lightbar 52 and the transparent element 58 inside the enclosure 60 and is used to channel the stray light sources into a narrow, uniform scan line beam 59 directly on the scan target 70. The transparent element 58 seals the window 61 of the enclosure 60 and can be made of a glass or other transparent materials, which allows the scan line beam 59 and incoming graphic images to pass but prevents contaminant from entering into the optical components of the camera and which may otherwise impact grading. The enclosure 60 accommodates the controller 20, the camera module 30, the mirror module 40 and the light source module 50 therein, which uses a bracket 5 with screws inserted at mounting holes 51 for integration onto the printing unit 1.

This invention relates to digital imaging systems which need to be calibrated for absolute reflectance values over a field of view. Such systems need to have a high degree of control over the illumination source and it is highly desirable to have the illumination as uniform as possible over the field of view. Typical illumination sources do not inherently produce uniform illumination without additional and often complex (costly) optics. Further, some illumination sources are not stable over time. This invention creates an illumination source from an array of low cost light sources, such as LEDs, to control the drive to the light sources so as to compensate for illumination variance in the system due to their positions in the array, and to utilize low cost optical elements, such as the Fresnel lens 55, to further channel and flatten the array of the LED light sources spatial distribution into a narrow, uniform scan line beam 59 directly onto the scan target 70. Thus, the lightbar 52 of the light source module 50 becomes the array of LEDs forming an LED lightbar electronically connected to an LED lightbar PCB. A shading cover 45 is set around the lightbar 52 as an illumination guide to ensure that the scan line beam 59 onto the scan target 70 directed through the Fresnel lens 55 does not interfere with the scanned images from the scan line 39 to the optical lens 35.

The lightbar PCB 53 of the light source module 50 is electronically connected to the controller 20. Thus, the lightbar 52 strobing can be synchronized with the camera sensor 33 and handled by the controller 20 as the master.

The mirror module 40 comprises a first mirror 40a and a second mirror 40b shown in FIG. 2 to illustrate a folded mirrors concept. The two mirrors are arranged with their reflection surfaces obliquely facing each other to ensure that the images of the printed labels 32 scanned from the scan target 70 on the moving media 16 exiting from the exit 56 after being reflected by these two mirrors are directed through the optical lens 35 to the camera module 30. Based on the requirement that the optical lens 35 must be directed towards the reflecting direction of the second mirror 40b, the relative position and orientation of the camera module 30 with respect to the mirror module 40 depends on that of the arrangement of the two mirrors. In one embodiment shown in FIG. 2 indicates that the image of the label 32 on the media 16 is reflected from the first mirror 40a to the second mirror 40b and then reflected through the optical lens 35 and into the camera sensor 33 of the vertically oriented camera module 30 to improve the compactness in longitudinal. As such, the mirror module 40 is located between the camera module 30 and the light source module 50. The same concept can also be applied to the situation that requires more than two mirrors. In this way, the mirror module 40 of the camera comprises at least two mirrors wherein the optical lens 35 is oriented towards the reflecting direction which is finally emitted from the mirror module 40. Thus, a folded optical path formed within the mirror module 40 allows the online data validator 2 adapted to be mounted closer to the printed label 32 and produced economically in a small volume. Compared with the existing technology as per U.S. Pat. No. 6,535,299 requires the verifier to mount 8 inches from the printed label 32, the compactness of the present invention allows the online data validator 2 adapted to be mounted about 3 inches from the printed label 32.

Accordingly, the optical lens 35 of the camera module 30 and the mirror module 40 function together to direct the image of the printed label 32 to the camera sensor 33, while the media 16 is exiting from the exit 56 of the printing unit 1. The camera sensor 33 of the camera module 30 is electronically connected to the sensor PCB 31, which is a 2D image sensor processor for transforming the image received by the camera sensor 33 into computer-readable information. The camera sensor 33 can be a CMOS (complementary metal-oxide semiconductor) image sensor or other commercial products. The computer-readable information is then sent to the controller 20 and used for verification of whether correct information is printed on the media 16. The optical lens 35 converts the resolution of the image to be compatible with the camera sensor 33 of the camera module 30.

The folded optical path formed in mirror module 40 makes the online data validator 2 fully integrated within the printing unit 1 reducing footprint and allowing for features such as backup and overstrike of the printed labels 32 with bad barcodes, where the barcode is unrecognizable as a barcode, or where the data encoded in the barcode is incorrect compared to the data sent to the printer, or the barcode has grades below thresholds set by the operator, or the barcode has dimensional parameters below thresholds established by the barcode standards. The printing unit 1 is able to extract the location of the barcodes as the host data stream and/or graphics are processed and provide those locations and symbols to the online data validator 2 in advance to relieve the need for time-consuming static identification and setup procedures. Thus, the online data validator 2 can scan, measure, and grade 1D barcodes in both picket fence and ladder orientation, as well as 2D barcodes. Further, the online data validator 2 is mounted away from the printed labels 32 and so does not pick up dirt and debris from the labels 32 and facilitates easy loading of ribbon 46 and the media 16, and different print technologies (such as thermal, inkjet, or laser). Lastly, the online data validator 2 scans the label 32 as it is printed to create swathes of data representing the printed format, and so is not constrained by having to see the whole label 32 before measurement and grading.

This invention relates to digital imaging systems which require precise alignment of the imager (i.e., the 2D digital camera sensor 33) to the targets (i.e., the labels 32) to be imaged. For such systems, it is often necessary to position the camera sensor 33 at a precise location in three dimensional axes as well as control the pitch, roll and yaw of the camera sensor 33 about the three axes. To be economically viable, this process needs to be easy for the operator to perform, quickly achieve the focus requirements of the system and yield a system that is stable over time. This invention teaches a method of achieving the desired alignment of the imager to the label 32 scanned from the scan target 70 by means of a two-step process, the first step being the internal alignment of the optical components of the camera and the second step being the mechanical alignment of the camera to the label 32.

Specifically, the first step, in one embodiment, is to set manually the mirrors alignment using set screw adjustments based on an image processing system and alignment fixture to provide feedback to the operator on the state of the alignment in real time. In another embodiment, the alignment is set automatically using closed-loop servo-control techniques.

The second step is to set the camera alignment to the label 32 by means of a mounting bracket 5 with set screw adjustments that control the pitch, yaw, and roll of the camera relative to the label 32. This technique can also be further optimized by using the closed-loop servo-control described in the first step.

The online data validator 2 includes a verification system from which users of the printing unit 1 can see in real time whether the desired information has been correctly printed on the media 16. The verification starts with the camera that is initiated to capture the image on the media 16 exiting from the exit 56 of the printing unit 1. The image of the scan target 70 is then analyzed to see whether the media 16 shows the correct label 32.

Specifically, the verification system can retrieve the correct barcode information from the database and compare it with the image received by the camera sensor 33 of the camera module 30. If there is a match, then the printing unit 1 will keep printing, conversely, if the verification system finds that the printed information on the media 16 is incorrect or does not meet the international barcode standard, the targeted area of the media 16 will be marked and implemented backup and overstrike of the labels 32 with bad barcodes.

While the preferred embodiments of the invention have been set forth for the purpose of disclosure, they are not the limitations of the invention, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An online data validator that is a digital imaging system integrated onto the front side of a printing unit, an exit of the printing unit that is set on the same side close to the online data validator for printing images of printed labels on a media exiting therefrom, the online data validator comprising:
a controller, a camera including optical components of a camera module, a light source module, and an enclosure;
wherein the controller receives and validates the printed labels that controls the online data validator operation and communicates with a controller of the printing unit,
the camera module having a camera sensor and an optical lens for capturing 2D digital images of the moving labels, the optical lens that is arranged between the camera sensor and the light source module,
the light source module providing internal light source for illuminating on the media exiting from the exit of the printing unit, and
the enclosure accommodating the controller, the camera and the light source module therein and having a window at a nearest distance from the exit.

2. The online data validator of claim 1, wherein of the camera module further comprises a sensor PCB electronically connected to the camera sensor.

3. The online data validator of claim 1, wherein the images of the printed labels on the media exiting from the exit are directed through the optical lens and into the camera sensor.

4. The online data validator of claim 1, wherein the camera further comprises a mirror module including at least two mirrors and the optical lens is oriented towards the reflecting direction that is finally emitted from the mirror module.

5. The online data validator of claim 4, wherein the at least two mirrors are arranged with their reflection surfaces obliquely facing each other, the images of the printed labels on the media exiting from the exit after being reflected by the reflection surfaces are directed through the optical lens and into the camera sensor.

6. The online data validator of claim 1, wherein the online data validator is configured to scan, measure and grade 1D barcodes in both picket fence and ladder orientation, and 2D barcodes.

7. The online data validator of claim 4, wherein the digital imaging system of the online data validator is capable of being precisely aligned to the printed label to be imaged by means of a two-step process, the first step being the internal alignment of the optical components of the camera and the second step being the mechanical alignment of the camera to the label.

8. The online data validator of claim 7, wherein the first step is to set manually the at least two mirrors alignment using set screw adjustments based on an image processing system and alignment fixture to provide feedback to the operator on the state of the alignment in real time, or the alignment is set automatically using closed-loop servo-control techniques.

9. The online data validator of claim 7, wherein the second step is to set the camera alignment to the label by means of a mounting bracket with set screw adjustments that control the pitch, yaw, and roll of the camera relative to the label, and wherein optional closed-loop servo-control techniques are further configured to refine the adjustment.

10. The online data validator of claim 1, wherein the light source module comprises a transparent element, a Fresnel lens, a lightbar and a lightbar PCB, the lightbar is electronically connected to the lightbar PCB, the transparent element is made of a glass or other transparent materials to seal the window of the enclosure and allows the light to pass through, and the Fresnel lens is placed between the lightbar and the transparent element.

11. The online data validator of claim 10, wherein a shading cover is set around the lightbar to ensure that a scan line beam directed through the Fresnel lens does not interfere with the scanned images to the optical lens.

12. The online data validator of claim 10, wherein the lightbar of the light source module is an array of LEDs forming an LED lightbar electronically connected to an LED lightbar PCB.

13. The online data validator of claim 10, wherein the light source module spatial distribution via the Fresnel lens is controlled to produce a narrow and uniform illumination field.

14. The online data validator of claim 10, wherein the lightbar PCB of the light source module is electronically connected to the controller to control the lightbar.

15. The online data validator of claim 1, wherein the printing unit is a thermal printer, an inkjet printer, or a laser printer.

16. The online data validator of claim 15, wherein the thermal printer using thermal transfer printing to generate the printed images on the media exiting from the exit is a ribbon with a thermal sensitive wax/resin, full wax or full resin formulation; or the media with dyes impregnated within the media fibers, and which turn black when heated.

17. The online data validator of claim 16, wherein the media is a paper or a plastic material.

18. The online data validator of claim 1, wherein the labels are 1D barcodes in either picket fence or ladder orientation, 2D barcodes, or graphic images.

19. The online data validator of claim 1, wherein the camera sensor of the camera module is a 2D digital imager.

20. The online data validator of claim 1, wherein the exit further includes limiters to constrain the printed labels near the scan target for improving scanning accuracy.

* * * * *